(12) United States Patent
Orgerie et al.

(10) Patent No.: US 8,276,845 B2
(45) Date of Patent: Oct. 2, 2012

(54) ADVANCED AIRCRAFT COCKPIT

(75) Inventors: Jean-Luc Orgerie, Toulouse (FR); Gilles Marquet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 237 days.

(21) Appl. No.: 12/668,572

(22) PCT Filed: Jul. 10, 2008

(86) PCT No.: PCT/FR2008/051302
§ 371 (c)(1),
(2), (4) Date: May 14, 2010

(87) PCT Pub. No.: WO2009/016300
PCT Pub. Date: Feb. 5, 2009

(65) Prior Publication Data
US 2011/0127380 A1 Jun. 2, 2011

(30) Foreign Application Priority Data

Jul. 12, 2007 (FR) ..................................... 07 05051

(51) Int. Cl.
*B64D 11/00* (2006.01)
*B64D 11/06* (2006.01)

(52) U.S. Cl. .................................. 244/118.5; 244/122 A

(58) Field of Classification Search ........................ None
See application file for complete search history.

(56) References Cited

U.S. PATENT DOCUMENTS

| 3,981,465 A | * | 9/1976 | Sinnett et al. ............. 244/122 A |
| 4,484,722 A | | 11/1984 | Larson et al. |
| 4,698,571 A | * | 10/1987 | Mizuta et al. ............... 318/568.1 |
| 7,733,480 B2 | * | 6/2010 | Le Texier et al. ............. 356/247 |
| 2003/0195686 A1 | | 10/2003 | Miller et al. |
| 2005/0261807 A1 | | 11/2005 | Sorensen |
| 2006/0015221 A1 | | 1/2006 | Sarkar |
| 2009/0015828 A1 | * | 1/2009 | Le Texier et al. ............. 356/247 |

FOREIGN PATENT DOCUMENTS

| DE | 19522897 A1 | | 1/1997 |
| FR | 2748240 | * | 7/1997 |
| WO | 9742050 A | | 11/1997 |

OTHER PUBLICATIONS

International Search Report and Written Opinion dated Feb. 11, 2009.

* cited by examiner

*Primary Examiner* — Mussa A Shaawat
(74) *Attorney, Agent, or Firm* — Perman & Green, LLP

(57) ABSTRACT

An aircraft cockpit that includes comfort and/or security adjustable equipment in which the adjustments are controlled by an adjustment management system so that, by the unique selection of a position desired by the pilot from at least two positions, the adjustment of each of the aforementioned members is modified from a current value to a predetermined value characteristic of the selected position and depending on the pilot. The data characteristic of the members adjustments controlled by the adjustment management system and depending on the pilot are stored in a mobile medium and read by a means for recognizing the aforementioned management system. The adjustments controlled by the adjustment management system can relate to piloting seats, piloting rudder bars, piloting armrests, individual aeration systems and individual lighting systems.

8 Claims, 2 Drawing Sheets

ADVANCED AIRCRAFT COCKPIT

CROSS-REFERENCE TO RELATED APPLICATIONS

This application is the National Stage of International Application No. PCT/FR2008/051302 International Filing Date, 10 Jul. 2008, which designated the United States of America, and which International Application was published under PCT Article 21 (s) as WO Publication No. WO2009/016300 A2 and which claims priority from, and the benefit of, French Application No. 200705051 filed on 12 Jul. 2007, the disclosures of which are incorporated herein by reference in their entireties.

BACKGROUND

The aspects of the disclosed embodiments are in the field of aircraft cockpits of civil transport aircraft.

More specifically, the aspects of the disclosed embodiments relate to an aircraft cockpit for aircraft in which the adjustments linked to the ergonomics of the aircraft cockpit, such as those of the seats occupied by the pilots during flights, the flight control sticks, or other comfort elements and safety elements, have advanced functions.

SUMMARY

An aircraft cockpit is a totally organized space in which the comfort of the pilots must be assured to prevent fatigue prejudicial to the safety of the control of the aircraft, and to guarantee access to numerous instruments and numerous essential controls arranged in a restricted space.

To see the instruments and to succeed in control actions without the risk of error, the crew, essentially the captain and the copilot of a civil transport aircraft, occupy precise positions in the cockpit during flight and during flight preparations.

In these positions that the pilots may occupy for a more or less long time, the temperature, ventilation, and the lighting must also in particular be such that each pilot is neither obstructed in performing his various tasks, monitoring the instruments, and actions on the controls in particular, nor is fatigued by non-optimal conditions of adjustment of these different parameters.

In practice, in an aircraft cockpit 1 as shown in FIG. 1 and in FIG. 2, the principal position of the pilots during flight corresponds to a piloting position in which each pilot is seated on a seat 2 that has adjustments by which each pilot places himself in the piloting position corresponding to his personal morphology.

In general, besides the piloting position, the seats 2 of the aircraft cockpit can take up various positions that are essential for the members of the crew even though they do not correspond to piloting positions.

A first such position, called a stowage position, is shown in FIG. 2 for the copilot's seat on the right in the cockpit 1 relative to the direction of flight of the aircraft, in which the seat of a pilot is in a position that allows the pilot to reach his seat. The arrangement of the structures is actually such that when the seat is in the piloting position, shown in FIG. 2 for the captain's seat on the left in the cockpit, the pilot is not able to reach the seat normally. The stowing position in general is accordingly a position in which the seat is moved back and to the side, which frees up a space 11 beside the seat 2, allowing the pilot to be seated without any particular contortions.

Other such positions, which depend on the pilot using the seat, correspond to rest positions or positions for lowered vigilance, which allow one of the pilots to place himself in a position of muscular relaxation during a long flight, for example, without leaving his piloting place when the other pilot provides the surveillance and the essential piloting functions.

Other elements of the cockpit 1 are adjustable depending on the pilot or on exterior conditions.

Among these other elements in particular are the control sticks 41, which can be adjusted along a longitudinal position, sources of ventilation 51, of which the flow rates, direction of flow, and temperatures can be controlled, and lights 52, of which the intensities and orientations can be controlled.

To allow each pilot in a cockpit 1 to put himself in an optimal position corresponding to the needs of the moment regardless of the morphology of said pilot, the seats 2 of the pilots are generally adjustable, i.e. the seats 2 are provided with various means for modifying the positions of movable parts by adjustments considered to be necessary or useful.

In most of the known seats 2 for transport aircraft pilots, such as the seat shown in FIG. 3, a seat cushion 21 of the seat on the one hand moves longitudinally back and forth 211 relative to the floor panel 12 of the aircraft cockpit 1, and moves up and down vertically 212 relative to the floor panel 12.

By these back and forth 211 and up and down 212 motions, each pilot is able to place himself personally, regardless of his size and morphology, more precisely to place his eyes at a point of reference in the aircraft that corresponds to a point that gives him the best view of the instruments 32 and the best access to the controls 31, 33, 34, considering his position in the cockpit 1.

In general, the longitudinal motion 211 is prolonged at a rear end of the course of the seat by a lateral motion 213 that opens up the passage 11 for the pilot, primarily between the seat and the central console 13 of the cockpit.

Another known motion of the aircraft pilots' seats corresponds to a variable inclination 221 of a back rest 22 hinged to the seat cushion 21 and combined with a back and forth and/or up and down motion 231 of a lumbar support 23 as the case may be, relative to the back rest 22.

In some cockpits developed for civil transport aircraft provided with lateral piloting handles 42, as shown in FIGS. 1 and 2 given by way of illustration, associated with electric flight controls, armrests called piloting armrests 24, are arranged close to the lateral piloting handles 42, for example integral with the seats.

Such piloting armrests 24 are essential items of equipment that permit the operation of piloting handles 42 for long durations and with the precision required, without fatiguing the pilot.

In this case again, adjustments of the armrests, adjustment in height 241 and adjustment in inclination 242, permit each pilot to find the best position of the armrest 24 depending on his morphology and on his own comfort criteria.

A problem in these types of equipment requiring adjustments for the particular pilot arises from the necessity for the pilot to perform control operations associated with said equipment for each adjustment 211, 212, 221, 231, 241, 242, etc., and after each action to seek the best adjustment for himself for the equipment chosen.

This situation arises especially each time the pilot takes charge of an aircraft and to a lesser extent when said pilot returns to his seat after having left it, and to do this has placed said seat in the stowage position, and each time he wants to change its position or adjustments.

To resolve these difficulties, two principal improvements have been made to the pilots' seats 2.

The first advance corresponds to motorizing certain motions of the seat 2, in particular the more laborious and the more frequently modified back and forth and stowage motions 211, 213 and the up and down motions 212 of the seat cushions 21 of the seat.

This motorization makes the motions easier for the pilot to accomplish and makes the positioning of the eyes more precise.

However, two control operations corresponding to the two motions have to be performed, and the search for the ideal position is often made by a series of control pulses to refine said position, with the effect of straining greatly the seat motorization elements, which may affect their operating reliability.

The second advance corresponds to position indicators, digits or letters on a scrolling or fixed scale associated with a cursor, which permits the pilot, once he has made the desired adjustments, to note them to be able to place himself again on these settings with the help of the scales, without making a more or less empirical search for the ideal position.

This method, however, requires the pilot to memorize each adjustment for each position. In practice, only the important adjustments such as those giving the position of the piloting armrests 24 have position scales and are used by the pilots, and in certain seats, the longitudinal and height positions of the seat cushion 21.

To make the other adjustments affecting the ergonomics of the cockpit, the following are generally provided, without this list being considered to be exhaustive:

a mechanical control to adjust the distance of the sticks 41 from the seat cushion of the seat 2 when said seat is in the piloting position, sometimes associated with a scale giving a position frame of reference that can be remembered by the pilot;

mechanical controls for adjusting the inclination 221 of the back rest 22 and the settings 231 for the position of the lumbar support 23;

ventilator outlets 51 that can be modified individually or collectively in orientation and/or in flow rate, and/or in temperature;

lights 52 that can be adjusted in intensity by electric controls, and for certain lights of the type of individual reading lights, that can be adjusted mechanically in orientation for the orientation of the beam of light emitted by said light.

The multitude of these adjustments and of the associated controls, some of which have to be modified multiple times in the course of a normal flight, and adjusted with precision in certain cases, are a source of work for the pilots that is added to the burden of piloting itself, and when scales exist that requires remembering the values associated with the position frames of reference.

In addition, if the pilot who seeks to adjust the particular positions of the various adjustable elements does not find the optimal positions for each adjustable element, he risks unintentionally adopting attitudes to compensate for deviations of the adjustments from the optimal, which over more or less long periods of time are sources of supplementary fatigue, or stiffness.

Accordingly, there is benefit in making a cockpit in which the adjustable elements of the cockpit, such as the pilots' seats, the flight control sticks, the lights, and/or the ventilators, are able to assume particular positions depending on considerations of the pilot in question himself, upon simplified instructions from the pilot.

To this end, the disclosed embodiments propose making an aircraft cockpit that has adjustable comfort and/or safety equipment, the settings of which are modified by a pilot depending on personal criteria, in which at least some elements of the adjustable items of equipment are controlled by an adjustment management system.

By a unique selection of a desired position by the pilot from at least two positions, the adjustment of each of the said elements is modified by the adjustment management system from a current value to a predetermined value characteristic of the selected position.

The characteristic data for the adjustments of the elements controlled by the adjustment management system, at least for those depending on the pilot, are stored by a ground station and transmitted by a link to means of recognizing in the management system dependent on the pilots who are in charge of the aircraft, and/or are stored in a mobile medium to be carried by the pilot when he changes planes or takes over an aircraft used by another pilot, and are read by means of recognition of the said management system.

To generate the data to be stored in the mobile medium, the characteristic data for the adjustments of the elements controlled by the adjustment management system correspond, for each position that may be selected by the pilot, to values measured by sensors when the corresponding position has previously been set manually.

When the adjustments have to be modified to correspond to another position, for safety reasons, the modifications of adjustments are controlled by a desired position selector on which a control action must be maintained while the modifications are being made.

To permit the pilot to adjust a position or to make adjustments manually in case of a breakdown of the adjustment management system, manual controls are placed in the cockpit for modifying the adjustments.

Depending on the desired safety level and comfort level, the adjustment management system controls:

adjustment of a longitudinal position of a pilot's seat cushion and/or;

adjustment of a transverse position of a pilot's seat cushion and/or;

adjustment of a height position above a floor panel of the cockpit of a pilot's seat cushion and/or;

adjustment of a position of a flight control stick and/or;

adjustment of a height position and/or inclination of a pilot's armrest and/or;

adjustment of the inclination of a back rest of a pilot's seat and/or of a height position and/or of the depth position of a lumbar support of the back rest and/or;

adjustment of one, two, or more individual ventilators in orientation and/or in flow rate, and/or of the air temperature and/or;

adjustment of one, two, or more individual lights in orientation and/or in luminous intensity.

To take into consideration the fact that a pilot may be led to pilot aircraft that have different cockpits, the mobile media preferably have in memory two or more sets of data characteristic of the adjustments of the elements controlled by the adjustment management system associated with different models of cockpits, and the adjustment management system has means for selecting the data corresponding to the cockpit under consideration.

The mobile media advantageously correspond to a means for identifying the pilot that is used in another aircraft device such as the means of authenticating the pilot.

BRIEF DESCRIPTION OF THE DRAWINGS

The description of the disclosed embodiments is written with reference to the figures that illustrate schematically and in a non-limiting fashion.

DETAILED DESCRIPTION

Figure 1:
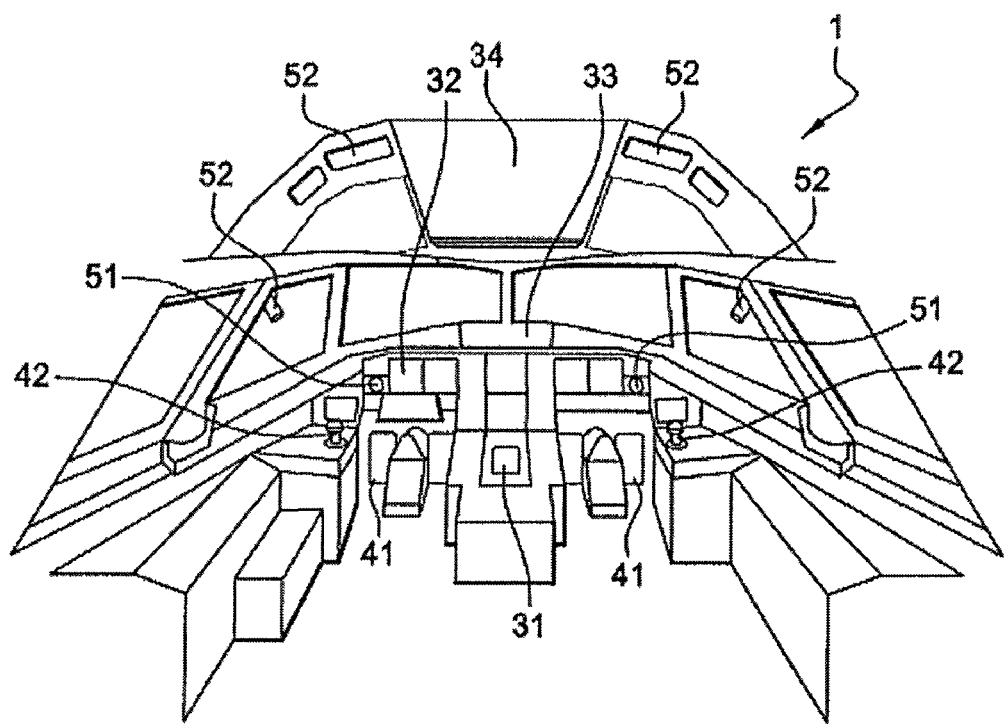
FIG. 1: already cited, a general perspective view from the back to the front of a modern civil transport aircraft cockpit without the pilots' seats.
Figure 2:
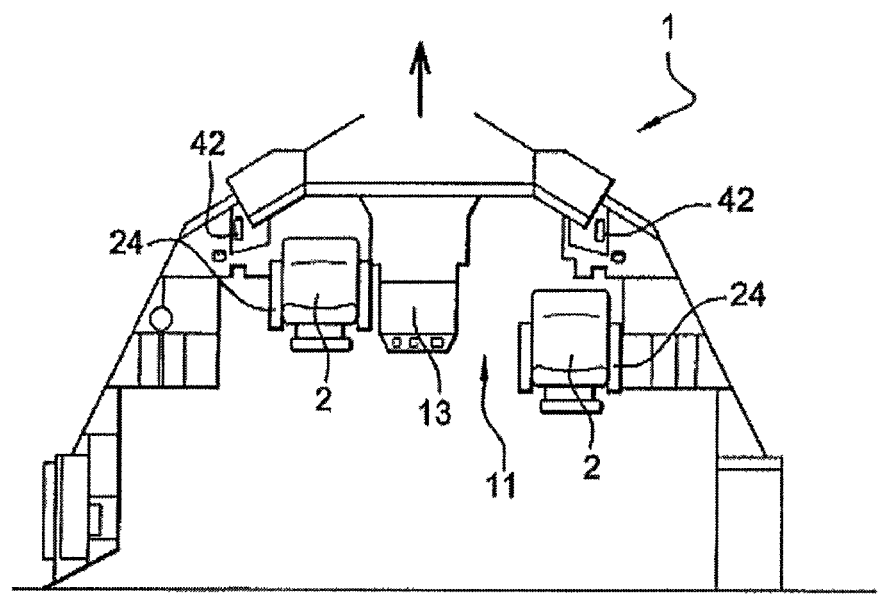
FIG. 2: already cited, a simplified view from above of the equipment setup of a cockpit corresponding to the cockpit of FIG. 1 in which the pilots' seats are shown in the piloting position on the left and in the stowed position on the right
Figure 3:
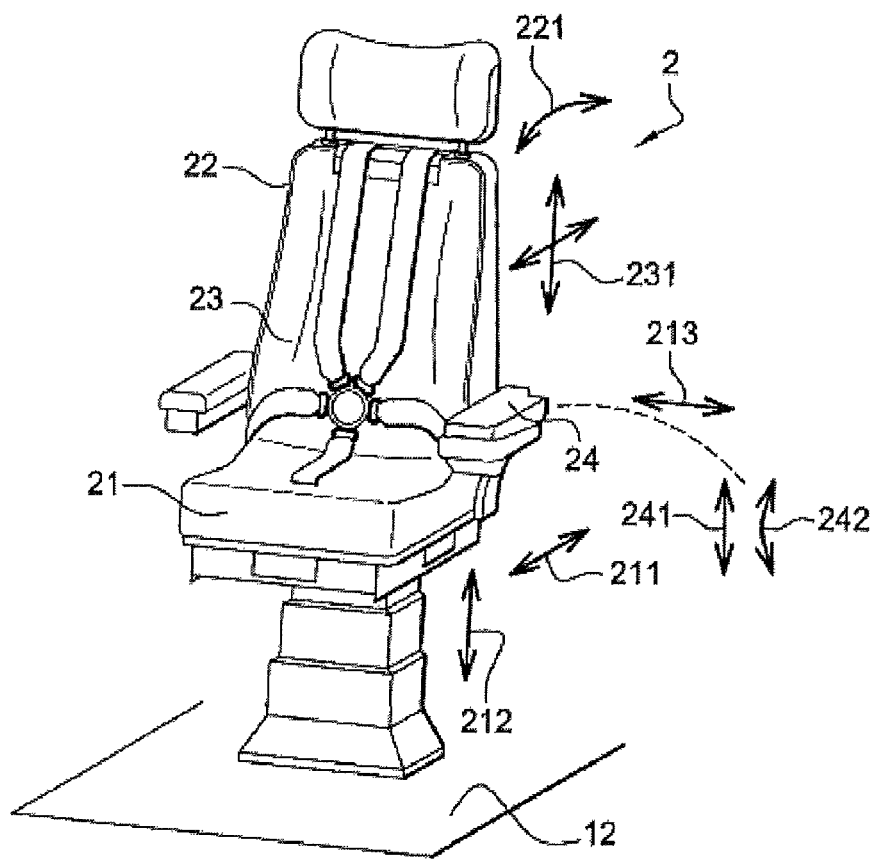
FIG. 3: already cited, a perspective view of a pilot's seat provided with a piloting armrest for a cockpit such as that of FIG. 1
Figure 4:
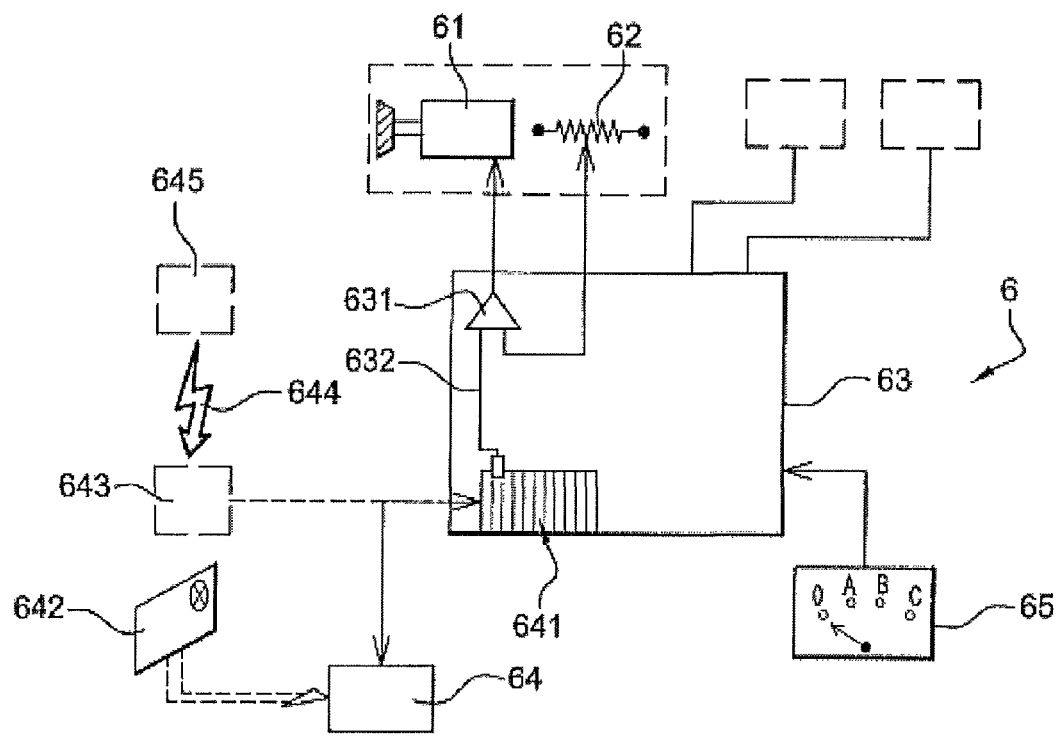
FIG. 4: a block diagram of the adjustment management system of the cockpit.

A cockpit 1 like that shown in FIG. 1 pursuant to the disclosed embodiments has an equipment adjustment management system in which optimal positions or certain ideal functional adjustments depend on a pilot using said equipment in said cockpit.

For the needs of the description of a detailed mode of the disclosed embodiments, the only items of equipment considered are the seats 2 used by the pilots and control sticks 41 located in front of each pilot.

However, the principles of the disclosed embodiments are applicable to other items of equipment such as ventilator outlets or lights, for example, and generally to any element for which each pilot is able to modify one or more of the settings of position, orientation, intensity, temperature, etc., depending on conditions that are characteristic of himself and are able to be different from one pilot to another occupying the same place in the aircraft.

To accomplish the movements of seat 2 or of a control stick 41, actuators 61 are arranged in said seat and said control stick so that each actuator is able to perform a motion of an adjustable element with which said actuator is associated, of said seat or of said control stick, and the adjustment of which is to be modifiable by the pilot.

The actuators 61 are advantageously used only to automate important adjustments and/or for adjustments that the pilot is caused to modify often during a flight.

As important adjustments, for example, it is reasonable to consider motions of the seat 2 that permit a pilot to position himself in a reference position for piloting that depends on his morphology, and to adjust the position of the control sticks or of a control armrest 24 for optimal piloting.

The motions that the pilot brings about frequently during a flight, for example are the passage of a seat 2 from a piloting position to a stowed position and the reverse, since it is necessary to perform this type of motion of the seat 2 to permit the pilot to leave his pilot's post for a moment.

On the other hand, a movement that the pilot modifies only in exceptional cases during a flight, for example, corresponds to the adjustment of a lumbar support 23 integral with a backrest 22.

The disclosed embodiments are described in detail with movements considered important for the seat 2 as an example:

- a back and forth longitudinal movement 211 of a seat cushion 21 of the seat relative to a longitudinal axis of the aircraft;
- a stowage movement 213 of the seat cushion 21 of the seat;
- an up and down vertical movement 212 of the seat cushion 21 of the seat relative to a floor panel 12 of the cockpit;
- a vertical movement 241 of the piloting armrest 24 to adjust the height of said armrest;
- a rotational movement 242 of the piloting armrest 24 in an essentially vertical plane to adjust the inclination of said armrest.

For each of the adjustable elements of the seat or of its piloting armrest or of the control sticks for which an actuator 61 produces movements, a means 62 of measuring the position delivers a signal characteristic of a position of the adjustable element that is actuated by said actuator.

Such a means of measurement 62 is advantageously composed of any known means for measuring a linear position or an angular position, such as digital scales, potentiometers, incremental sensors, etc., that can deliver an electrical signal or other signal, optical for example, as a function of the position of either the adjustable element in question or of the actuator 61 itself, the position of which is equivalent in some cases. The type of sensor of the means of measurement 62 is adapted to the parameter to be measured, as the case may be, if it is not a question of a linear or angular position.

The signals representative of the positions of the various adjustable elements whose movements are produced by the actuators 61 are received by a position-management device 63, which compares the measured position 631 with the desired position 632 at a given time for each of the adjustable elements.

The desired position 632 for each of the elements is determined by two conditions.

The first condition corresponds to the morphology of the pilot who is to occupy the pilot's place corresponding to the seat 2 and to the control stick 41 in question.

Since a given aircraft may be piloted a priori by any pilot qualified by the company, and the crew for a given flight may be decided upon or modified at the last moment, the position-management equipment 63 has means 64 for recognizing the pilot, more particularly means for acquiring data for parameters 641 corresponding to the adjustments of positions for the elements as determined for the pilot under consideration.

A second condition corresponds to the position chosen by the pilot from a list of positions in which he should be able to position himself.

In a non-limiting way, the following positions are identified as being able to be chosen by the pilot:

- a "piloting" position corresponding to the adjustments of the seat, seat cushion, and piloting armrest, and of the control sticks under optimal piloting conditions;
- a "stowed" position in which the seat is moved back and moved aside to free up access 11 toward the front of the seat;
- one or more "rest" positions in which the seat is in intermediate longitudinal positions more to the rear than the "piloting" position so as to give the pilot on the seat the ability for more ample motions when he is not in charge of piloting. This or these "rest" positions, as the case may be, are associated with particular inclined positions of the back rest 22 when said back rest is also provided with an actuator.

For safety reasons, the movements of the adjustable elements moved by the actuators 61 are inhibited in the absence of action by the pilot involved.

The pilot determines a desired position, "piloting," "stowed," "rest1", etc., as already described, for example by means of a selector 65, and actuates a control to change position of the type of a maintained action, for example by a button to be held down, in other words the actuator(s) 61 function to bring each adjustable element to the corresponding desired position if and only if the pilot keeps the control active. If the pilot releases said control for changing position, all of the actuators 61 stop functioning, even if the desired position has not yet been reached for all of the adjustable elements.

This type of control permits avoiding injuries by pinching, for example pinching an arm or a leg between the seat and a structure in the cockpit, since as soon as the pilot lets go of the control, all of the automatic movements of the adjustable elements involved come to a stop.

Obviously, if the pilot keeps the control active, the movements of the actuated elements continue until the positions defined for each adjustable element are reached for the selected position, and are then automatically stopped.

When the adjustable elements are at a stop, a situation that the pilot perceives either sensorially by the absence of motion or secondarily by a light or other signal that signals this situation to him, he releases the control and the actuators 61 are then no longer under power.

Since the actuators 61 are no longer powered unless the pilot takes action, there is no risk of untimely initiation of motion, for example after a failure of a sensor 62, which would not be controlled by the pilot and which in other words could lead to a surprise in a phase of flight that could be very critical.

The functioning of an actuator 61 to bring an adjustable element to the desired position is conventionally carried out by comparing the position measured by the sensors 62 for each adjustable element moved by an actuator 61 with the desired position 632 associated with the position selected by the pilot. The comparison is made by the position-management equipment 63, advantageously by means of calculation incorporated in said equipment, which power the actuators 61 and control the power supplied to said actuators.

In another embodiment of the adjustment management system 6, the actuators 61 are provided with integrated logic and receive a signal from the position-management equipment 63 for the position to be reached, and the actuator itself manages its power supply to reach the desired position. In this embodiment, the actuators 61 also receive an inhibition signal to prevent any untimely movement in the absence of pilot control; the said inhibition signal may consist of a power supply cutoff, electrical for example, for the actuator 61.

The position-management equipment 63 advantageously activates the various actuators in the sequences and the speeds of motion set up as a function of criteria adapted to the change of position under consideration, for example a speed criterion to move rapidly to the piloting position when this position is selected, and a comfort criterion associated with reduced speeds of motion to go to a rest position.

In an aircraft cockpit, it is important for a pilot to be able to take the actions that he desires without having them totally imposed by automation.

When the seat 2 and the control sticks 41 have reached a position by a selection of the pilot, as just described, the pilot retains the ability to modify the position of the various adjustable elements.

To this end, each adjustable element is able to be controlled manually by the pilot independently of the other adjustable elements.

For this purpose, the electrical controls and/or the mechanical controls allow bypassing the commands of the adjustment management system 6, either by acting on the actuators 61 for motorized bypassing, or by a totally mechanical method, which permits modification and adjustment of the various adjustable elements even in the partial or total absence of operation of the adjustment management system 6, and in particular of the power supply to the actuators 61, whether the power supplies to said actuators have failed or whether the pilot has decided to inhibit said power supplies.

To reach a given position under the control of the pilot, the adjustment management system 3 must be aware of the corresponding positions of each adjustable element that are to be reached.

As already stated, these positions are peculiar to each pilot that the adjustment management system does not recognize a priori.

In an embodiment, to become familiar with the particular positions for a pilot, the device 64 for recognizing a pilot has means for reading data representative of the adjustments to be made for each position, stored in a mobile medium 642 held by the pilot and which is personal for him.

In another embodiment associated or not with the preceding form, the device 64 for recognizing the pilot receives the personal data associated with the pilots about to take charge of the aircraft from a linkage system 643 with a ground station 645 of the company that uses the aircraft, preferably a radio or infrared link 644, for example a "datalink" or "gatelink" linkage.

In an initial step, when the necessary data are not in memory in said medium or known by said ground station, the pilot executes a data memorization sequence corresponding to each position to be adjusted automatically.

To do that, the pilot manually adjusts the position of his seat and of the control sticks in succession into the different ideal positions corresponding to his morphology.

For each position obtained, the pilot validates the settings made, which are then recorded by the equipment 63, using the signals received from the position sensors and copied to the mobile media 642 or transmitted to the ground station 645.

It is not necessary to perform a memorizing operation for the positions that are independent of the pilot, for example the "stowed" position. For such a position, the corresponding settings are advantageously memorized in the adjustment management system 6 of the aircraft, and cannot be modified by the pilot.

Once the data 641 are memorized, the pilot is then able to transmit said data in any cockpit 1 to the adjustment management system 6 by means of the mobile medium 642 or the ground station 645 to the means of the linkage 644, by a reading operation of said mobile medium, which is done with or without contact depending on the type of medium used, or by a transmission operation.

The mobile medium 642 is essentially a portable means of memorizing that can take numerous forms, for example a rewritable digital memory such as a flash memory that can be placed on a carrier board. Said carrier board is also advantageously an advanced means of identification such as an electronic badge that permits identifying the capacity of authorized pilot of the aircraft in consideration, and of activating the vital functions of the aircraft before startup and takeoff to avoid malevolent actions on the ground by unauthorized outsiders.

Various advances are incorporated in the cockpit 1, as the case may be, for its operation with the adjustment management system 6.

The data recorded in the mobile medium 642 are thus associated with an identification of the type of aircraft in question, and multiple sets of data are memorized if needed, with each set of data corresponding to a model of aircraft that the pilot uses. In this case, the motion management system 6 of the cockpit 1 is able to select the proper set of data.

When the pilot uses a model of aircraft for the first time, the device verifies for the first time if a set from among the sets of data memorized is compatible with the cockpit of said model of aircraft, for example a cockpit whose adjustments are identical to the extent of belonging to a homogeneous family.

If no compatible set is detected, the device signals to the pilot that the memorization sequence should be called upon, which the pilot is still free to do immediately or not, or to perform later.

In a particular from of embodiment of the disclosed embodiments, position sensors for some mobile elements not provided with actuators controlled by the position management equipment 63 are used to inform the adjustment management system 6 of the positions of said mobile elements so that the movements performed by the commands of the adjustment management system 6 at the time of automatic changes of position and/or of movements accomplished with actuators but controlled manually are inhibited or are accomplished with particular sequences when risks of interference with fixed elements of the cockpit exist.

For example, retreating movements of the seat cushion of a seat are limited or inhibited when the back rest is inclined and when too great a retreat would lead to contact of the back rest with a rear partition.

The invention claimed is:

1. Aircraft cockpit that has at least one adjustable element of one or more of adjustable comfort or safety equipment whose adjustment is modified between two or more values by a pilot, with said values being established in advance depending on personal criteria of said pilot, with the at least one adjustable element being controlled by an adjustment management system,
   wherein said adjustment management system has a memory for storing data characteristic of said values established in advance, and has an adjustment change control so that an action by the pilot on said control modifies the adjustment of the at least one adjustable element from a current value to a predetermined value characteristic of a desired adjustment selected by the pilot from among at least two different adjustments, and
   wherein the memory stores data characteristic of the adjustment of the elements controlled by the adjustment management system associated with different models of cockpits and in which the adjustment management system has means of selecting data corresponding to at least one of the different models of cockpits.

2. Cockpit according to claim 1 in which the data characteristic of the adjustments of the adjustable elements controlled by the adjustment management system that depend on the pilot are memorized by a ground station) and transmitted by a linkage to means of recognition in said management system.

3. Cockpit according to claim 1 in which the data characteristic of the adjustments of the elements controlled by the adjustment management system and that depend on the pilot are memorized in a mobile medium and are read by means of recognition in said management system.

4. Cockpit according to claim 3 in which the mobile medium also has means of pilot authentication.

5. Cockpit according to claim 2 in which the data characteristic of the adjustments of the elements controlled by the adjustment management system correspond for each adjustment that can be selected by the pilot to values measured by sensors when the adjustment was made manually in advance.

6. Cockpit according to claim 1 that has a selector for a desired adjustment from among two or more adjustments, on which a control action must be maintained for the duration of the adjustment modifications performed by the adjustment management system.

7. Cockpit according to claim 1 in which the at least one adjustable element is associated with a manual control for modifying the adjustment independently of the adjustment management system.

8. Cockpit according to claim 1 in which the adjustment management system controls one or more of an:
   adjustment of a longitudinal position of a pilot's seat cushion of a pilot's seat;
   adjustment of a transverse position of a seat cushion of a pilot's seat;
   adjustment of a height position above a floor pane of the cockpit of a pilot's seat cushion of a pilot's seat;
   adjustment of a position of a flight control stick;
   adjustment of a height position and/or inclination of a pilot's armrest;
   adjustment of the inclination of a back rest of a pilot's seat and/or of a height position;
   adjustment of the depth position of a lumbar support of the back rest;
   adjustment of one, two, or more individual ventilators in orientation in or flow rate;
   adjustment of an air temperature; or
   adjustment of one, two, or more individual lights in orientation in or luminous intensity.

* * * * *

UNITED STATES PATENT AND TRADEMARK OFFICE
CERTIFICATE OF CORRECTION

| | | |
|---|---|---|
| PATENT NO. | : 8,276,845 B2 | Page 1 of 1 |
| APPLICATION NO. | : 12/668572 | |
| DATED | : October 2, 2012 | |
| INVENTOR(S) | : Jean-Luc Orgerie et al. | |

It is certified that error appears in the above-identified patent and that said Letters Patent is hereby corrected as shown below:

Column 10, line 43, Claim 8, delete "in or" and insert -- or --, therefor.

Column 10, line 46, Claim 8, delete "in or" and insert -- or --, therefor.

Signed and Sealed this
Eighteenth Day of December, 2012

David J. Kappos
*Director of the United States Patent and Trademark Office*